US011882124B1

(12) United States Patent
Keating

(10) Patent No.: US 11,882,124 B1
(45) Date of Patent: Jan. 23, 2024

(54) ACCOUNT INTEGRATION WITH AN EVENT-DRIVEN APPLICATION PROGRAMING INTERFACE CALL MANAGER

(71) Applicant: Amazon Technologies, Inc., Seattle, WA (US)

(72) Inventor: Jared Keating, Castle Rock, CO (US)

(73) Assignee: Amazon Technologies, Inc., Seattle, WA (US)

( * ) Notice: Subject to any disclaimer, the term of this patent is extended or adjusted under 35 U.S.C. 154(b) by 656 days.

(21) Appl. No.: 17/105,213

(22) Filed: Nov. 25, 2020

(51) Int. Cl.
| | |
|---|---|
| *H04L 29/06* | (2006.01) |
| *H04L 9/40* | (2022.01) |
| *G06F 9/54* | (2006.01) |
| *G06F 16/22* | (2019.01) |
| *H04L 67/10* | (2022.01) |
| *H04L 67/53* | (2022.01) |

(52) U.S. Cl.
CPC .......... *H04L 63/102* (2013.01); *G06F 9/542* (2013.01); *G06F 9/546* (2013.01); *G06F 9/547* (2013.01); *G06F 16/2246* (2019.01); *H04L 63/0884* (2013.01); *H04L 67/10* (2013.01); *H04L 67/53* (2022.05)

(58) Field of Classification Search
CPC ... H04L 63/102; H04L 63/0884; H04L 67/53; H04L 67/10; G06F 16/2246; G06F 9/542; G06F 9/546
See application file for complete search history.

(56) References Cited

U.S. PATENT DOCUMENTS

| | | | | |
|---|---|---|---|---|
| 11,676,126 | B1* | 6/2023 | Caceres | G06Q 20/108 |
| | | | | 705/42 |
| 2007/0226306 | A1* | 9/2007 | Cesarini | G06Q 30/04 |
| | | | | 709/206 |
| 2010/0169441 | A1* | 7/2010 | Lafleur | H03M 7/30 |
| | | | | 709/206 |

(Continued)

OTHER PUBLICATIONS

Infoblox, "DNS Scavenging: Managing DNS Records in Today's Dynamic Environments", available at «https://www.infoblox.com/resources/videos/infoblox-dns-scavenging-managing-dns-records-todays-dynamic-environments/», Jan. 2021, 3 pages.

*Primary Examiner* — Vance M Little
(74) *Attorney, Agent, or Firm* — Lee & Hayes, P.C.

(57) ABSTRACT

Technologies are disclosed for integrating an account with a third-party application. Upon completion of an account creation procedure or an account configuration procedure at a service provider network, a system may automatically (e.g., absent additional manual inputs) integrate the new account and/or the account configuration with the third-party application, for instance, such that the new account and/or the account configuration is replicated across multiple cloud accounts managed by the third-party application. The service provider network may comprise an organization account creator, an account configurer, an event monitor for detecting an account-related event (e.g., occurring at the organization account creator and/or the account configurer), and an event-driven API call manager for receiving an event message from the event monitor, and executing code previously stored in an non-executing state to send one or more API calls to the third-party application for integrating the account with the third-party application.

20 Claims, 7 Drawing Sheets

(56) References Cited

U.S. PATENT DOCUMENTS

| | | | |
|---|---|---|---|
| 2013/0204925 A1* | 8/2013 | McDougall | H04L 67/01 709/203 |
| 2014/0201083 A1* | 7/2014 | Nowack | H04L 67/104 705/51 |
| 2016/0171475 A1* | 6/2016 | Hughes | G06Q 30/02 455/456.3 |
| 2017/0012974 A1* | 1/2017 | Sierra | H04W 12/08 |
| 2019/0095911 A1* | 3/2019 | Narasimhan | G06Q 20/40 |
| 2020/0218580 A1* | 7/2020 | Kim | G06F 9/5072 |
| 2020/0252400 A1* | 8/2020 | Pike | G06F 21/42 |
| 2020/0274835 A1* | 8/2020 | McCue | H04L 51/48 |
| 2021/0081947 A1* | 3/2021 | Hockey | G06Q 20/4014 |

\* cited by examiner

ACCOUNT INTEGRATION WITH AN EVENT-DRIVEN APPLICATION PROGRAMING INTERFACE CALL MANAGER

BACKGROUND

Organizations typically use multiple cloud services and applications for managing company data and generating company accounts for company personnel to access the company data. Larger organizations may manage thousands of accounts across government and commercial partitions. As companies grow, add business units, and develop new products, new policies and rules are created to apply to new types of accounts so the personnel associated with the account is granted access to the proper company data. The computing resources to manage the accounts increases as systems grow in complexity to scale up with company growth and apply more and more complex policies to different types of accounts. Typical queuing services for managing accounts must continuously execute code and consume substantial processing resources to keep accounts and account policies up to date.

Moreover, when a new account is created from a cloud-computing resource, additional time, computing resources, and manual inputs are typically required to notify and configure third-party applications of the new account or to replicate the configuration across multiple cloud platforms.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
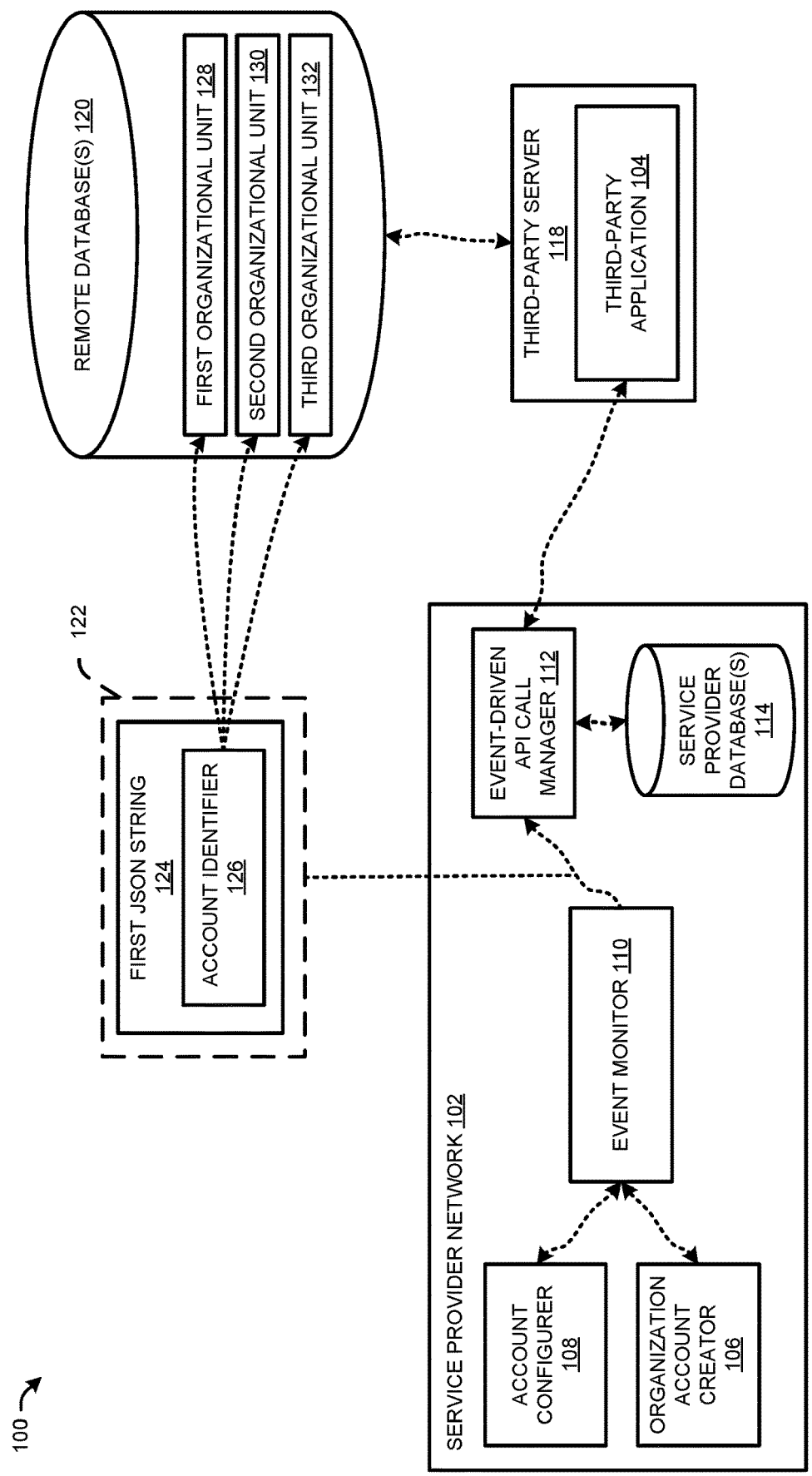
FIG. 1 depicts a schematic diagram of an example system for integrating an account created at the service provider network with a third-party application comprising multiple hierarchical data structures.

The following detailed description is directed to one or more system(s) and processes (hereinafter the "system") for integrating an account or cloud account created at a service provider network with a third-party application. The third-party application may, in some instances, provide multi-cloud account management services for managing multiple cloud accounts provided by multiple, different service provider networks (e.g., an AWS® account, an Azure® account, and a Google Cloud® account). For instance, a business may use an AWS® service provider network to support accounts for research and development personnel, a Google® service provider account to support accounts for advertising personnel, and an Azure® service provider network to support accounts for corporate enterprise planning personnel. Many personnel may have accounts needing support by all three service providers to provide overlapping access to different company resources. The third-party application may provide integration and visualization services so the multiple cloud services can be monitored and managed.

In some examples, the third-party application may use hierarchal data structures or "Organizational Units (OUs)" to represent various relations or associations of the accounts to other accounts, for instance, of a particular business segment, unit, project, or operation, and/or any other accounts of the business at large. In some examples, in addition or alternatively to hierarchical data structure, other data structures may represent relationships of an organization, such as a mesh data structure, a hub data structure, a delimited list, etc. In some instances including hierarchical data structures, the relations or associations may comprise a "vertical association" indicating that account settings, characteristics, or values of a lower account comprise a sub-group or a set of variations of account settings, characteristics or values of an upper account, for instance, based on a type of vertical association. A child account generated through access of another, parent account comprises a vertical association to the parent account. If the child account is associated with an employee and the parent account is associated with a manager of the employee, the vertical association may comprise a manager-type association and may include a pre-defined set of account values for this type of vertical association. The relations or associations may comprise a "horizontal association" indicating that a first account shares a similar, identical, or corresponding account setting, characteristic, or value with a second account. Horizontal associations may represent common traits across accounts.

In some examples, the relations or associations represented by the OUs may provide data for mapping rules and polices to accounts (e.g., to govern security and access for the accounts) such that substantial resources must be spent by the third-party application to keep the OUs up-to-date. However, accounts may be created and reconfigured outside of third-party application at the service provider networks themselves without direct involvement of the third-party application. For instance, an AWS® account may be created at the AWS® network service provider or an already existing AWS® account may be reconfigured at the AWS® service provider. Rather than require the third-party application to expend substantial computing resources (e.g., by sending API queries to API end points via a polling method that sends API calls continuously or according to a timed and/or repeating schedule in order to detect changes or request a current status update) to detect all new accounts and account configurations, the system may integrate the AWS® account with the third-party resource using AWS® network service provider resources.

In some examples, upon completion of an account creation procedure or an account configuration procedure at a particular service provider for the third-party application (e.g., a new AWS® account), the system may improve the computing architecture and the physical network node by automatically (e.g., absent additional manual inputs) integrating the new account and/or the account configuration with the third-party application, such that the new account and/or the account configuration is replicated across the multiple service provider accounts operated, managed, monitored, or displayed by the third-party application. As such, the system may provide a "bottom-up" account integration—integration from one service provider network, up to the third-party application, and across the remaining service provider networks being monitored and visualized by the third-party application.

In some examples, the system discussed herein may reduce processing and memory requirements for the system, such as the third-party application. Typically, the third-party application would apply changes to each account from each service provider network in a "top-down" approach to manage the multiple, different service provider network accounts. The third-party application may continuously spend computing resources, via API queries to monitor the OUs defining the account relations. However, the system disclosed herein may automatically integrate new accounts from one service provider with OUs of other service providers using computing resources of the service provider network from which the new account originated, rather than resources of the third-party application to improve the efficiency of the underlying computing infrastructure of the third-party application and the service provider network.

In some examples, the service provider network may comprise multiple, inter-operating virtual services and network functions stored and/or executed at one or more network nodes. Virtual services may include an organization account creator for creating the account and an account configurer for applying settings to the account. Network functions may include an event monitor for detecting an account-related event (e.g., occurring at the organization account creator and/or the account configurer) and an event-driven API call manager for receiving an event message from the event monitor and sending one or more API calls to the third-party application for integrating the account with the third-party application. The virtual services and network functions may, in some instances, perform an ordered operation of steps on specialized computing devices (e.g., customized network servers) that results in improved integration of cloud-accounts with third-party application. As such, the ordered combination of steps may cause a reduction in processing and memory requirements of both the service provider network and the third-party application.

For instance, the event-driven API call manager may comprise at least a portion of code stored in a non-executed state until the event-driven API call manager is triggered by the event message. The portion of code may cause the one or more API calls to the third-party application. By storing the portion of code, prior to receiving the event message, in a non-executing state, the system may reduce processing requirements of the service provider network by avoiding continuous execution of code (e.g., API queries). Moreover, the event-driven API call manager may reduce computing requirements of the third-party application by reconfiguring OUs stored at the remote databases via one or more API calls generated and sent by the event-driven API call manager to cause changes to the hierarchical structure of the OUs. The event-driven API call manager may reduce time for implementing accounts, groups, and rules by reducing slower manual inputs of personnel using the third-party application, which would otherwise be required to incorporate the new account or account configuration across multiple OUs.

In some examples, the event monitor may generate the event message to trigger the event-driven API call manager based on a first JavaScript Object Notation (JSON) string received from the organization account creator or the account configurer. In some instances, a first partition may provide a first access-level (e.g., a government access-level) to the third-party application such that the event-driven API call manager may only receive the event message from the organization account creator (omitting the account configurer). A second partition may provide a second access-level (e.g., commercial access-level), to the third-party application such that the event-driven API call manager may receive the event message from the organization account creator or the account configurer. As such, the system may be able to integrate accounts for multiple, different third-party applications servicing multiple, different types of entities requiring different partition and access-levels (e.g., government entities and commercial entities). Partitions may be applied to a particular third-party application based on a type of entity using the third-party application, and partitions may comprise a static characteristic determining which virtual services or types of services may comprise a source of account-related events (e.g., indefinitely or permanently). The versatility of using the system for different entity types of entities without needing particularized or customized architectures may (e.g., by using partitions), in some instances, reduce processing requirements and memory requirements of the service provider network.

In some examples, the first JSON string in the event message may include an account identifier, which the event monitor may aggregate with additional metadata received from other network nodes, and the event monitor may send the event message to the event-driven API call manager to indicate an occurrence of the account-related event. The event message may comprise a trigger for the event-driven API call manager. In response to receiving the event message, the event-driven API call manager may identify previously-stored code, including instructions for generating and sending API calls, to execute. Upon executing the previously-stored code, the event-driven API call manager may generate and send one or more API calls to the third-party application, causing the third-party application to store the account identifier associated with a particular organizational unit. Accordingly, the system may integrate the account with the third-party application in a manner that reduces processing and memory requirements of the network nodes of the service provider network and the third-party application (e.g., by avoiding reliance on continuously-executing systems such as API query systems) and reduces implementation time for new accounts (e.g., by reducing a number of required manual steps or user inputs).

FIG. 1 depicts an example system 100 that may include a service provider network 102 for providing services to a third-party application 104. The system 100 may include virtual services and other functions/network nodes of the service provider network 102 for integrating a new account or account configuration into the third-party application 104, such as a multi-cloud account management service to manage personnel accounts for an entity (e.g., a commercial entity or a government entity) and/or multiple, different entities receiving services from multiple, different cloud providers. The service provider network 102 may provide some accounts to the third-party application 104, and other service providers may provide other accounts to the third-party application 104. The system 100 may provide "bottom-up" integration of a new account created at the service provider network 102 up to the third-party application and across the remaining service provider networks.

In some examples, the virtual services of the service provider network 102 may comprise cloud-computing services such as an organization account creator 106 for generating an account (e.g., an AWS® account) via an account creation procedure, and an account configurer 108 for performing an account configuration procedure on the account. The service provider network 102 may comprise other network functions such as an event monitor 110 for detecting account-related events or other events occurring at the virtual services of the service provider network 102, and/or an event-driven API call manager 112 for receive communications from the event monitor 110 and generating, sending, and receiving API calls to and from the third-party application 104. The service provider network 102 may comprise one or more server provider database(s) 114 for storing/hosting data for the service network provider 102. The third-party party application 104 may be stored and/or executed outside of the service provider network 102, for instance at a third-party server 118 and/or one or more remote database(s) 120 storing data for the third-party application 104.

Figure 4:
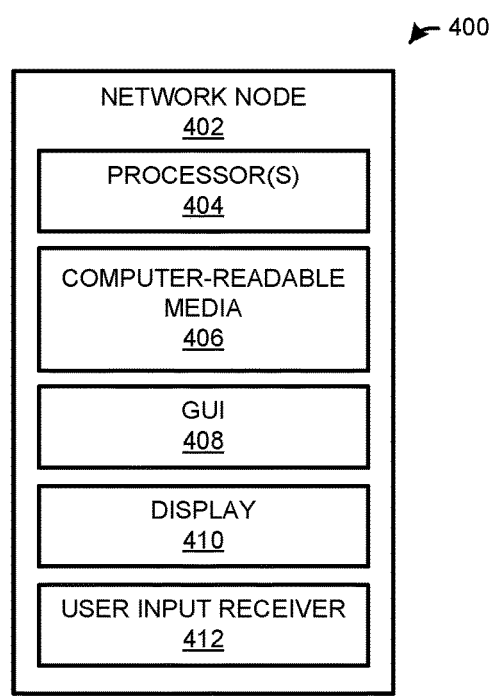
FIG. 4 depicts a schematic diagram of an example system for integrating the account with the third-party application, including a network node for hosting a virtual service or other service provider network functions, which may form at least a part of any systems discussed herein.

In some examples, the service provider network 102 may comprise one or more physical service provider network servers (e.g., network node 402 discussed in further detail regarding FIG. 4.) and/or virtual services stored and executed on the service provider network 102 to provide software services (e.g., cloud-computing services, Infrastructure as a Service (IaaS), Software as a Service (SaaS), and/or Platform as a Service (PaaS), etc.), to the third-party application 104. For instance, the service provider network 102 may provide back-end data storage/management and processing, virtual machine instances, and various virtual services for business applications, such as message queuing, account creation and configuration, security and authentication, system redundancy, analytics (e.g., speech-to-text converter, image recognition, speech recognition, and/or other machine learning), and/or developer tools. The virtual services and network functions of the service provider network 102 may communicate with each other based on a standardized protocol (e.g., Simple Object Access Protocol (SOAP)) and/or architecture (Representational State Transfer (REST)) over Hypertext Transfer Protocol (HTTP). The service provider network 102 is discussed in greater detail below regarding FIGS. 7 and 8.

In some examples, the third-party application 104 may comprise a software application using one or more services of the service provider network 102. For instance, the service provider network 102 may include cloud-computing services, such as an account creation and management service to the third-party application 104. In some instances, the third-party application 104 may comprise multi-cloud account management software for managing various cloud accounts on different cloud services (e.g., CloudTamer.io). The multi-cloud account management software may receive account creation and management data from multiple, different service provider networks 102 and may continually update information stored at the remote database(s) to maintain accurate data for the accounts. The multi-cloud account management software may host, at the remote database(s) a web portal for providing visualizations and/or management controls to the accounts provided from the multiple, different service provider networks 102, and may communicate with the multiple, different service provider networks 102 via API calls. In some examples, the third-party application 104 may comprise a particular business application, such as a network monitoring application or a billing application, which may receive services from multiple service providers.

In some examples, the organization account creator 106 may comprise an account creation service for creating accounts and managing the accounts. An account of the accounts may include data (e.g., one or more JSON strings) particularized for an individual to provide personalized settings for retrieving data accessed through a login of the account. The account may include account information particular to the account such as billing information, user(s) associated with the account, user permissions, services associated with the account, payment methods, personal information (e.g., email, address, phone number, names, identifiers), security credentials, and/or usage reports. In some instances, the account may comprise a set of accounts, a subscription to a particular service, and/or other data associating particular information or access settings to a particular user.

In some examples, the organization account creator 106 may generate, apply, and/or store one or more groups (e.g., associations of the accounts with a group identifier and/or with each other), which may correspond to organizational structure of the entity. A group may comprise associations of accounts within a single OU (e.g., vertical associations), associations of accounts within multiple OUs (e.g., horizontal associations), and/or combinations thereof. For instance, a group may comprise "research and development," "finance," "marketing," or "corporate enterprise planning." A group spanning across multiple OUs may indicate data generated from different business units, operations, and/or locations that is consolidated for a particular account. In some instances, a group may comprise a static characteristic of an account in that it may last indefinitely, may omit any predefined end time, or may have a tentative end time linked to a project.

In some examples, the organization account creator 106 may generate, apply, and/or store one or more projects associated with the accounts (e.g., associations of the accounts with a project identifier and/or with additional project data), which may correspond to business projects of the entity. For instance, a project may correspond to a particular product or phase of a product cycle, a particular marketing campaign, a cost-reduction campaign, a research project, an annual report, or any other undertaking or operation of the entity involving generation of data to be accessed by the accounts. A project may comprise associations of accounts within a single OU (e.g., vertical associations), associations of accounts within multiple OUs (e.g., horizontal associations), and/or combinations thereof. Projects may comprise a temporary characteristic in that projects may have a pre-defined time period or end date.

In some examples, the organization account creator 106 may generate, apply, and/or store one or more rules. A rule may be applied to an account, a group, a set of groups, a project, and/or a set of projects to determine which particular virtual services of the virtual services provided by the service provider network 102 are accessible to the accounts within the group or project. For instance, a rule may indicate how particular back-end data storage/management and processing, virtual machine instances, or various virtual services may provide security and authentication for the accounts. Such rules may correspond to activities of the entity by providing group management and billing procedures, building security settings, research database authentications, document editing permissions, and/or other services to accounts to which the rules are applied. For instance, an example rule may indicate that accounts in the research and development group have particular security credentials to a particular database and/or accounts not in the research and development group omit the particular security credential. An example rule may indicate that accounts associated with an Information Technology (IT) group have 24 hour network access, and/or that non-IT-group-related accounts have less than 24 hour network access. An example rule may indicate that accounts related to the finance group may access an accounting application. An example rule may indicate that accounts associated with a particular product development project have access to computer-aided design (CAD) application. An example rule may indicate that accounts associated with a particular research project have access to particular modeling application. In some instances, relations of accounts to each other may be indicated by a common rule applied to the accounts, groups associated with the accounts, and/or projects associated with the account. As such, rules may be used to determine the particular OU identifier position of the account indicating a location of the account within the hierarchical structure of the particular OU (e.g., stored at the remote database(s) 120).

In some examples, the organization account creator 106 may store or determine a particular OU identifier associated with an account that indicates a particular location in a particular OU of third-party application 104, for instance, during the account creation procedure. The location within the hierarchical structure of the OU may indicate relations of accounts to each other based on one or more of a parent-child relations, a group, a projects, or a rule. For instance, the account may comprise a child account to a parent account (e.g., vertical association) and, thus, a certain rule associated with the parent account may be determined to apply to the child account. The system 100 may deduce the particular OU identifier from the child-parent relation. Alternatively, determining that the account is associated with a particular rule may indicate other accounts associated with the new account (e.g., by determining the other accounts are also associated with the rule), which may be used to determine the particular OU identifier. In some instances, the organization account creator 106 may determine a particular group associated with the new account and, based on the particular group, determine that the account has a vertical association with another account and/or a horizontal association with the other accounts represented by the particular OU stored at the remote database(s) 120 (e.g., associated with multiple, different service providers). By way of example, the organization account creator 106 may comprise AWS® Organizations or other similar cloud-computing account-related services. Any of the operations performed by the organization account creator 106 discussed herein may comprise the account-related event, provide information for a first JSON string 124, and/or cause the event monitor 110 to send the event message 122 to trigger the event-driven API call manager 112.

In some examples, the account configurer 108 may comprise an account configuration service to perform the account configuration procedure. The account configuration procedure may comprise a process for determining that an account created on the service provider network 102 (e.g., by the organization account creator 106) satisfies pre-defined policies (e.g., security settings, operations settings, and/or compliance settings). The pre-defined policies may be established as best practices by the service provider network 102 to provide optimal computing performance for the virtual services, and/or the pre-defined policies may be provided by or particularized for the third-party application 104 and/or the entity associated with the third-party application 104 to correspond to particular organizational structure, groups, or projects of the entity. In some examples, the account configuration procedure may comprise the account configurer 104 preventing deployment of accounts that do not conform to security, operations, and/or compliance policies. The account configurer 108 may continuously monitor deployed account resources for nonconformance. The account configurer 108 may perform account configuration procedures to the account, such as applying pre-defined security settings, operations settings, and/or compliance settings to set up the account for a multi-account environment. The account configurer 108 may make changes to and/or create a multi-account categorization structure by generating OUs, group identifier, or project identifiers, and/or by modifying existing OUs, group identifiers, or project identifiers associated with account. In some examples, the account configurer 108 may provide identity and access management, account provisioned workflows, security and compliance management, non-compliant account detection, and/or generate visual summaries (e.g., via a web portal rendered on a graphical user interface of a display). The account configurer 108 may configure the account to satisfy the configurations of the multi-account environment. By way of example, the account configurer 108 may comprise AWS® Control Tower or other similar cloud-computing services. Any of the operations performed by the account configurer 106 discussed herein may comprise the account-related event, provide information for the first JSON string, and/or cause the event monitor 110 to send the event message 122 to trigger the event-driven API call manager 112.

In some examples, the event monitor 110 may detect the account-related event occurring at the organization account creator 106 and/or the account configurer 108. The event monitor may comprise a monitoring and observability service that collects monitoring and operational data such as logs, metrics, and events. The event monitor 110 may detect anomalous behavior, set up alarms, and generate visualizations of system-wide performance for resource optimization and troubleshooting, such that developers and engineers may respond to performance changes. The event monitor 110 may detect an identity and access management (IAM) event, creation of a user, creation of a user role, creation of a group created, creation of a server instance, or any of the operations of the organization account creator 106 or the account configurer 108. As such, the event monitor 110 may send and/or receive one or more API calls to and/or from the organization account creator 106 and the account configurer 108 to determine if an account-related event has occurred.

By way of example, the event monitor may comprise Amazon CloudWatch or other similar cloud-computing services.

In some examples, the event-driven API call manager 112 may comprise a service for storing executable instructions (e.g., code) in a non-executed state and, upon receiving a trigger, such as an event message 122, causing one or more processors to execute the code. The event message 122 may comprise a message generated at the event monitor 110 particularly formatted with instructions to trigger the event-driven API call manager 112. The event message 122 may be generated with formatting and strings (e.g., the first JSON string and/or the metadata) that indicate which portion of stored, non-executing code the event-driven API call manager 112 is to select and execute. For instance, the event message 122 may include information identifying the third-party application 104 and/or API call requirements of the third-party application, and information about the account (e.g., an account identifier 126, the particular OU identifier, groups, projects, rules, etc.) to be sent to the third-party application 104.

In some examples, the event-driven API call manager 112 executing the code previously stored in a non-executed state may cause the event-driven API call manager 112 to generate and send the one or more API calls. For instance, executing the code may cause the event-driven API call manager 112 to access and/or receive data from the event message 122 and/or one or more server provider database(s) 114. The event-driven API call manager 112 may generate and/or send the one or more API calls based on information included in the event message 122 such as performing an authentication procedure with the third-party application 104; requesting a list of OUs 204 associated with the third-party application 104; and/or causing the account identifier 126 to be associated with the particular OU at the third-party application 104.

In some examples, the event message 122 may indicate the occurrence of a new domain name system (DNS) entry (e.g., a creation of a new server instance) or other DNS-related event, in addition to or alternatively to an account-related event. In some instances, the event-driven API call manager 112 may execute code to send one or more API calls to other virtual services or network functions of the service provider network 102 to cause the new DNS entry to be replicated throughout the server provider network 102 and/or to avoid resource-intensive polling commands. For instance, the DNS-related event may be integrated with a cybersecurity automation application, such as Infoblox®.

In some examples, the third-party server 118 may comprise a server device outside of the server provider network 102, for instance, on a third-party server network or other network operated by a different operator than the service provider network, differently geographically located, and/or requiring different credentials than the server provider network 102. The third-party server 118 may receive and/or send data to and/or from the one or more remote database(s) 120 (e.g., database(s) outside the service provider network). In some instances, the third-party server 118 may comprise any of the hardware or software components of the network node 402 discussed below regarding FIG. 4.

In some examples, the third-party application 104 may store information at the remote database(s) 120, such as a first OU 128 corresponding to accounts of the service provider network 102; a second OU 130 representing account relations of a second, different servicer provider network; and/or a third OU representing account relations of a third, different service provider. In some examples an OU (e.g., the first OU 128, the second OU 130, the third OU, etc.) may comprise a mixed-service OU in that a single OU may store account information for multiple, different service providers (AWS®, Azure®, Google® Cloud, etc.). In some instances, OUs may overlap in that there may be relationships between multiple OUS and accounts, for instance, where multiple, different service providers are intermingled or separated. Upon sending the one or more API calls to the third-party application, the event-driven API call manager may cause the account to be integrated with the third-party application 104, for instance, by causing the account identifier 126 to be associated with the first OU 128, the second OU 130, and/or the third OU 132, as discussed herein.

Figure 2:
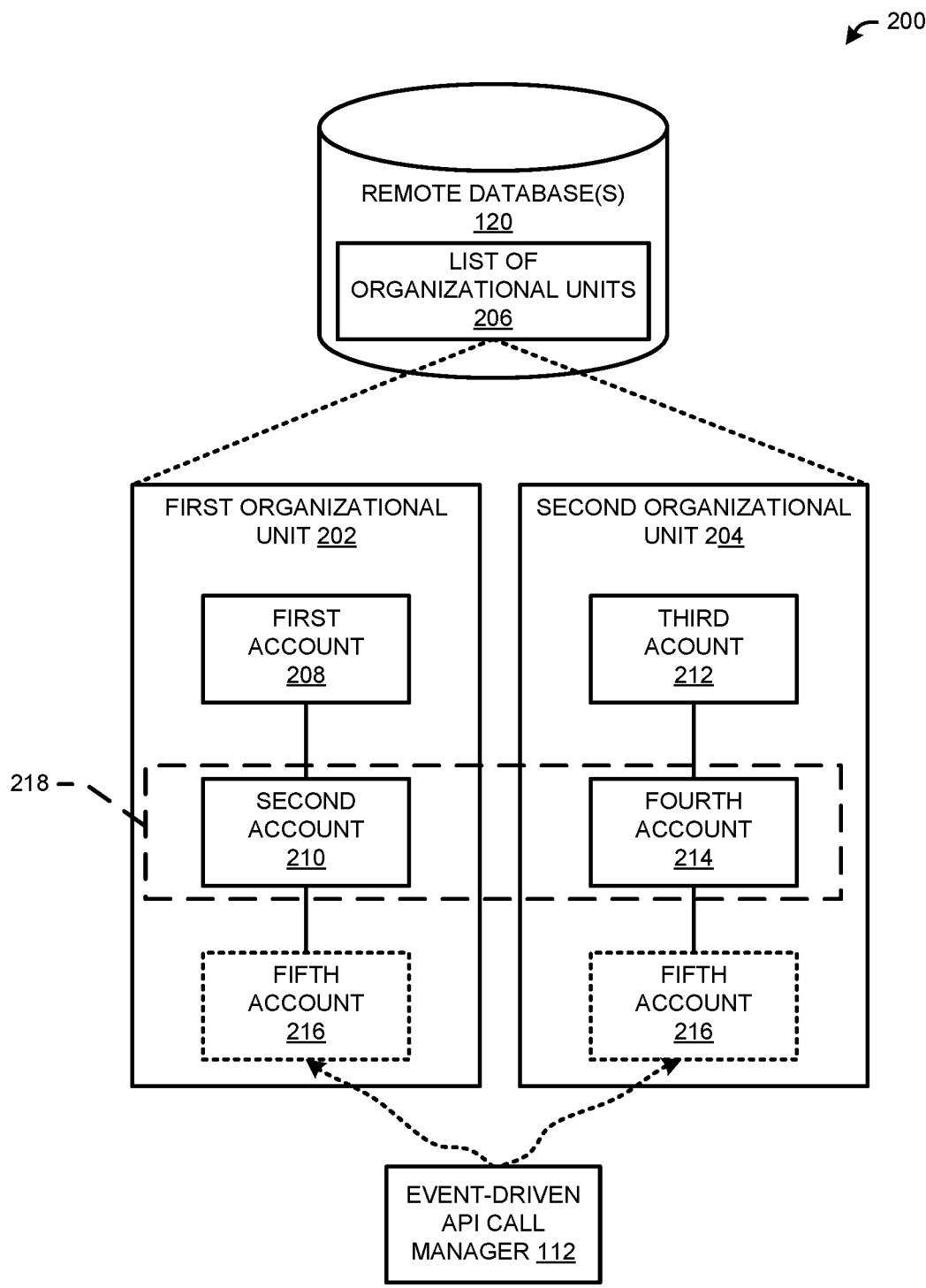
FIG. 2 depicts a schematic diagram of an example system for integrating the account with the third-party application, including an account identifier associated with a particular hierarchical data structure, which may form at least a part of any systems discussed herein.

FIG. 2 depicts an example system 200 that may be similar to, identical to, or form a portion of any of the systems discussed herein. FIG. 2 illustrates additional details of how the system 100 may add the account to multiple OUs stored at the remote database(s) 120, integrating the account with the third-party application 104.

The system 200 may comprise the event-driven API call manager 112 generating and/or sending one or more API calls to integrate the account created at the service provider network 102 with the third-party application 104. The event-driven API call manager 112 may perform an authentication procedure with the third-party application 104 and may cause the account identifier 126 to be associated with a first OU 202 of the third-party application 104 and a second OU 204 of the third-party application 104. The event-driven API call manager 112 may perform analysis on information included in the event message 122 to determine a first particular location within a first hierarchy of the first OU 202 and a second hierarchy of the second OU 204. Additionally or alternatively, the analysis may be performed at other network functions (e.g., the event monitor 110) and/or virtual services (e.g., the organization account creator 106 or the account configurer 106).

In some examples, the event-driven API call manager 112 may access and/or receive the event message 122 from the event monitor 110, which may trigger the event-driven API call manager 112 to execute code corresponding to the trigger (e.g., the trigger may comprise the event message 122). The event message 122 may include information gathered from the account-related event by the event monitor 110 to be included in the one or more API calls (e.g., the account identifier, the particular OU, a particular group, a particular project, a particular rule). The event message 122 may comprise the first JSON string 124 and/or additional metadata associated with the account. For instance, the first JSON string 124 may be generated by the account configurer 108 based on initiating, performing, or completing of an account configuration procedure and/or by the organization account creator 106 based on initiating, performing, or completing an account creation procedure. The first JSON string 124 may comprise one or more of an account identifier name (e.g., provided via a user input during the account creation procedure), an email address (or other identifying information) associated with the account (e.g., provided during the account creation procedure), a new account number, an OU identifier associated with the account (e.g., the particular OU identifier). The metadata may comprise additional information added to the first JSON string 124 by the event monitor 110 to generate the event message 122 (e.g., to transform the first JSON string 124 into the event message 122) and/or to provide additional material to the event-driven API call manager 112 for determine locations in OU hierarchies. For instance, the additional information may provide additional JSON strings transforming the first JSON string 124 into the event message 122, such as by adding particular formatting, header information, or body information to make the event message 122 trigger the event-driven API call manager 112, and/or indicating additional account information (e.g., group information, project information, and/or rule information). The event-driven API call manager 112 may parse the first JSON string 124 and/or the additional JSON strings and use values, strings, and/or alphanumeric symbols from the first JSON string 124 and/or the additional JSON strings as variables in the code that is executed by the event-driven API call manager 112 in response to the trigger.

In some examples, the event-driven API call manager 112 may generate a first API call to send to the third-party application 104 to perform an authentication procedure with the third-party application 104. The authentication procedure may, upon completion, give the event-driven API call manager 112 access to the third-party application 104 APIs, for instance, to access information stored by the third-party application 104 (e.g., at the remote database(s) 120). In response to receiving the first API call, the third-party application 104 may send a first response including a security token to the event-driven API call manager 112.

In some examples, the event-driven API call manager 112 may send a second API call to the third-party application 104 including a request for the list of OUs 206 associated with the third-party application 104. The third-party application 104 may send the list of OUs 206 which may include OU identifiers indicating the first OU 202 and the second OU 204. The first OU may indicate relations of a first account 208 to a second account 210, and the second OU may indicate relations of a third account 212 with a fourth account 214.

In some examples, the event-driven API call manager 112 may identify the first OU 202 from the list of OUs 206 as the particular OU corresponding to the account. For instance, the event-driven API call manager may match the OU identifier included in the event message 122 with an OU identifier from the list of OUs associated with the first OU 202(e.g., via a comparison loop). The event-driven API call manager 112 may send a third API call to the third-party application 104 instructing the third-party application 104 to add the account to the first OU 202 corresponding to the particular OU identifier. For instance, the event-driven API manager 112 may cause a fifth account 216 to be associated with second account 210 with a vertical association. The third-party application 104 may, in response to receiving the third API call, store (e.g., at the remote database(s) 120) the account identifier 126 associated with the first OU 202, such that the account identifier 126 indicates a position within the hierarchical structure of account relationships represented by the first OU 204.

In some examples, the event-driven API call manager 112 may send a fourth API call to the third-party application 104 causing the third-party application 104 to associate the account identifier with the second OU. For instance, the event-driven API call manager 112 may determine that a particular group, project, or rule 218 is associated with second account 210. The event-driven API call manager 112 may determine that the fourth account 214 is also associated with the particular group, project or rule 218 (e.g., a horizontal association). In response, the event-driven API call manager 112 may determine to associate the account identifier with the second OU 204, adding the fifth account to the second OU 304 with a vertical association to the fourth account based on the particular group, project, or rule 218

In some examples, the event-driven API call manager 112 may generate and/or send additional API call querying the third-party application 104 for one or more projects, groups, or rules associated with the particular OU identifier. For instance, the third-party application 104 may have project data, group data, or rule data stored at the remote database(s) indicating relationships between the first OU 202 and the second OU 204, and/or between accounts represented by the first OU 202 and the second OU 204. The third-party application 104 may send the project data, group data, or rule data in response to receiving the additional API call. The event-driven API call manager 112 may use the project data, group data, or rule data to identify other OUs related to the new account to be updated.

In some examples, the upon storing an association of the account identifier 126 with the first OU 202 and the second OU 204 at the remote database(s) 120, the account may be integrated into an account management system of the third-party application 104 via the one or more API calls of the event-driven manager 112, and the process may reduce computing requirements and manual user inputs subsequent to the initial account creation procedure and/or account configuration procedure.

Figure 3:
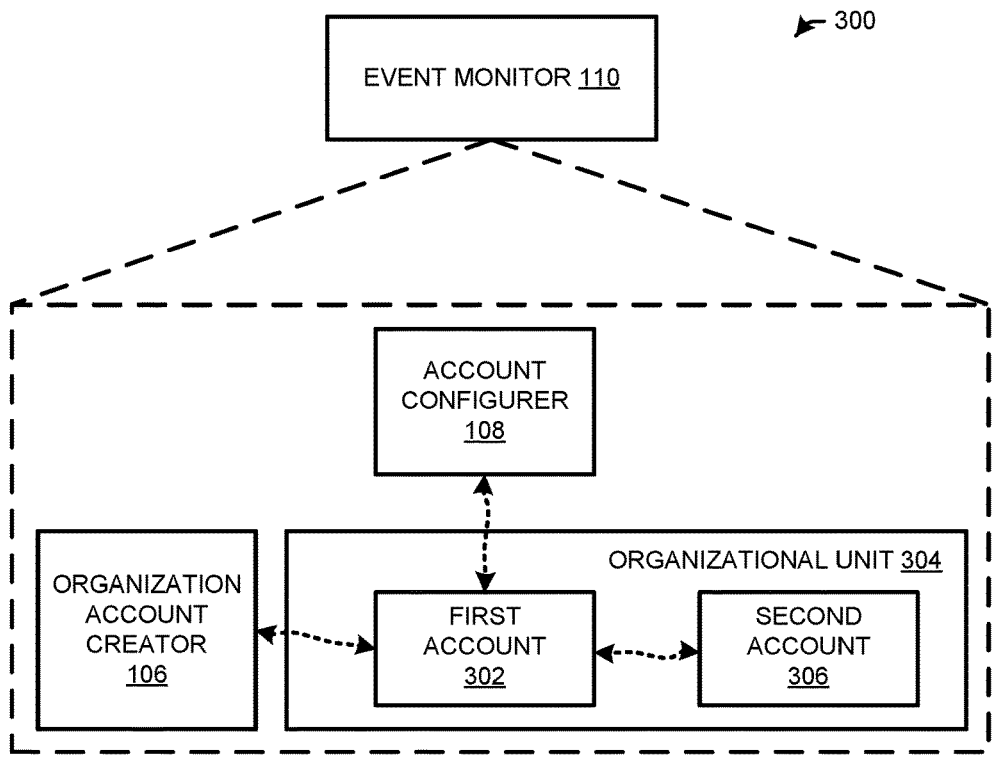
FIG. 3 depicts a schematic diagram of an example system for integrating the account with the third-party application, including an event monitor to detect an account-related event occurring at virtual services of the service provider network, which may form at least a part of any systems discussed herein.

FIG. 3 illustrates an example system 300 that may be similar to, identical to, or form a portion of any of the systems discussed herein. FIG. 3 illustrates additional details of how the event monitor 110 may detect account-related events or other events occurring at the service provider network 102.

In some examples, the event monitor 110 may comprise monitoring and observability service that collects monitoring and operational data to determine the occurrence of the account-related event. The event monitor 110 may set up alarms and generate visualizations of system-wide performance for resource optimization and troubleshooting, such that developers and engineers may respond to performance changes. As such, the event monitor 110 may send and/or receive one or more API calls to and/or from the organization account creator 106 and the account configurer 108 to perform event monitoring operations, and/or the event monitor 110 may receive information via the SOAP protocol/REST architecture. For example, the event monitor 110 may detect one or more account-related events or other events, such as an initiation, occurrence, and/or completion of the account creation procedure (e.g., at the organization account creator 106) and/or the account configuration procedure (e.g., at the account configurer 108). The one or more account-related events may be initiated by one or more user inputs or API calls from other services of the service provider network 102. In some instances, the one or more account-related events may comprise a closure of account and/or receiving a message indicating an account closure request and/or an account closure confirmation.

In some examples, the event monitor 110 may detect creation of a first account 302. The first account 302 may be associated with an OU identifier corresponding to an OU 304. A second account 306 may be created, for instance, from the first account 302. That is, the second account 306 may be created as a child account to the first account 302 (e.g., parent account) such that characteristics, associations, rules, policies, and/or identifiers associated with the first account 302, such as the OU identifier, are associated with the second account 306. The OU identifier may indicate a vertical association of the second account 306 to the first account. In some instances, the event detector 112 may monitor for creation of any accounts, such as the second account 306, from the first account 302, such that creation of the second account 306 triggers the event monitor 112 because of an association of the second account 306 to the first account 302. In other words, the event monitor 110 may be configured to generate an event message 122 in response to an account being created from particular, predetermined parent (e.g., as indicated by the entity or third-party application 104).

FIG. 4 illustrates an examples system 400 that may be similar to, identical to, or form a portion of any of the systems discussed herein. The system 400 may comprise a network node 402 of the service provider network 102 for performing any of the operations discussed herein.

In some embodiments, the network node 402 may comprise a set of algorithms, a set of API calls, a software component, and/or other executable instructions executed by one or more processor(s) 404 such as a microprocessor, a microcomputer, a microcontroller, a digital signal processor, a central processing unit (CPU), a graphics processing unit (GPU), or combinations thereof, etc. Among other capabilities, the processor 110 may operate to fetch and execute computer-readable instructions stored in computer-readable media 406 to perform the operations disclosed herein.

In some examples, the computer-readable media 406 may comprise one or more non-transitory storage devices such as phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), field-programmable gate arrays (FPGA), digital versatile discs (DVD) or other optical storage, magnetic cassettes, magnetic tape, magnetic disk storage or other magnetic storage devices, genetic encoding storage device, other medium that can be used to store information in one or more databases for access by an electronic device, or combinations thereof.

In some examples, the network node 402 may store, at the computer-readable media 406, one or more applications for communicating with other network nodes 402 of the service provider network 102 and/or the third-party application 104. The one or more applications may utilize any number of communication methods to communicate across the network including remote procedure calls, SOAP-based web services, remote file access, proprietary client-server architectures, and the like. In some instances, the application may provide a Graphical User Interface (GUI) 408 to a display 410 by accessing the computer-readable media 406 with the one or more processor(s) 404. In some examples, the network node 402 may receive one or more user inputs via a user input receiver 412. For instance, the user input receiver 412 may comprise a portion of the GUI 408, a touchscreen, a touchpad, a microphone, a camera, a motion sensor, or any other component for receiving the user input (e.g., at the user network node 402 or remote from the network node 402 via a separate device in communication with the network node 402) and/or transforming the user input into data (e.g., via a transformed voltage signal) representing information of the user input.

In some examples, a first network node 402 of the service provider network 102 may host, store, and/or execute a first virtual service such as the organization account creator 106; a second network node 402 of the service provider network 102 may host, store, and/or execute a second virtual service such as the account configurer; a third network node 402 of the service provider network 102 may host, store, and/or execute a first network function such as the event monitor 110; a fourth network node 402 of the service provider network 102 may host, store, and/or execute a second network function such as the event-driven API call manager 112; a fifth network node 402 of the service provider network 102 may host, store, and/or execute the service provider database(s) 114; and/or combinations thereof. In some examples, one or more of the network nodes discussed above may be combined. For instance, the organization account creator 106 and the account configurer may both be hosted, stored, and/or executed at the first network node 402; the event monitor 110 and the event-driven API call manager may both be hosted, stored, and/or executed at the second network node 402; and/or the virtual services and network functions may be hosted, stored, and/or executed at a single network node 402.

Figure 5:
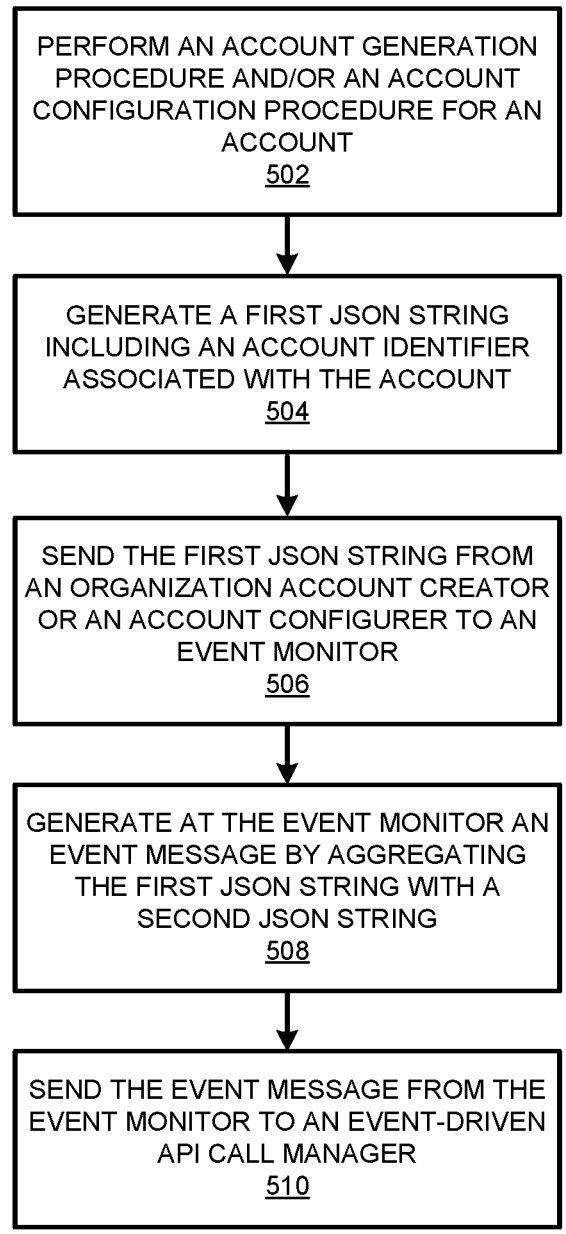
FIG. 5 depicts a flow diagram of an example method for integrating the account with the third-party application, including sending the event message to an event-driven application programming interface (API) call manager, which may be performed by any systems discussed herein.

FIG. 5 depicts an example method 500 that may be performed by any of the systems discussed herein. In some examples, the method 500 may include steps for triggering the event-driven API call manager 112 based on an account-related event. Although steps of the method 500 may be performed by any of the systems disclosed herein, the steps are described below as being performed by the system 100 for brevity sake.

At step 502, the system 100 may perform an account generation procedure and/or an account configuration procedure for an account. For instance, the system 100 may generate the account in response to user input at the organization account creator 106 and/or the account configurer 108. In some examples, the organization account creator 106 may be partitioned with a particular access or security-level higher than the account configurer 108 such that some third-party applications 104 may be partitioned for government-level access and other third-party application 104 for commercial-level access. Commercial-level partitioning, including both the account configurer 108 and the organization account creator 106, may generate an account-related event by one or both of an account generation procedure or an account configuration procedure, whereas government-level partitioning, including the organization account creator, may generate an account-related event by an account generation procedure, excluding the account configuration procedure.

At step 504, the system 100 may generate the first JSON string 124 including the account identifier 126 associated with the account. For instance, the organization account creator 106 may create the first JSON string 124 by extracting information gathered during the account generation procedure, by user inputs (e.g., in response to prompts generated by the service provider network 102) and/or API calls by the organization account creator 106 to collect information about the account and transform that information into the first JSON string 124. Additionally, or alternatively, the account configurer 108 may apply one or more configuration procedures to an account (e.g., already created by the organization account generator 106) generate the first JSON string 124 in response to the account-related event. For instance, the account configurer 108 may perform configuration operations for setting up a multi-account environment on the service provider network 102, such as by providing a multi-account categorization structure, identity and access management, account provisioned workflows, security and compliance management, non-compliant account detection, and/or generate visual summaries (e.g., via a web portal rendered on a graphical user interface of a display). The account configurer 108 may configure the account to satisfy the configurations of the multi-account environment. Any of these steps may comprise the account-related event and may provide information to the account configurer 108 for generating the first JSON string 124, such as the account identifier 126 and/or the particular OU identifier.

At step 506, the system 100 may send the first JSON string 124 from the organization account creator 106 or the account configurer 108 to the event monitor 110. For instance, the organization account creator 106 or the account configurer 108 may be stored and/or executed at a first network node 402 of the service provider network 102, and the event monitor 104 may be stored and/or executed at a second network node 402 of the service provider network 102, such that the organization account creator 106 or the account configurer 108 may communicate seamlessly and automatically via API calls within the service provider network 102 to transmit the first JSON string 124 from the first network node 402 (e.g., the organization account creator 106 or the account configurer 108) to the second network node 402 (e.g., the event monitor 110).

At step 508, the system 100 may generate, at the event monitor 110, an event message 122 by aggregating the first JSON string 124 with a second JSON string. In some examples, the second JSON string may comprise metadata corresponding to the account. The metadata may comprise additional information such as the account name, the email address, the new account number, the particular OU identifier. The event monitor 110 may use the metadata to apply additional code, changes, formatting, etc., to transform the first JSON string 124 and/or the second JSON string into the event message 122 structured to trigger the event-driven API call manager 112 to execute a particular code (e.g., previously-stored by the event-driven API call manager 112).

At step 510, the system 100 may send the event message 122 from the event monitor 110 to the event-driven API call manager 112. For instance, the event monitor 110 may be stored and/or executed at the second network node 402 of the service provider network 102, and the event-driven API call manager 112 may be stored and/or executed at a third network node 402 of the service provider network 102, such that the event monitor 110 may communicate seamlessly and automatically via API calls within the service provider network 102 to transmit the event message 112 from the second network node 402 (e.g., the event monitor 110) to the third node 402 (e.g., the event-driven API call manager 112).

At step 512, the system 100 may integrate the account into the third-party application 104. For instance, the event-driven API call manager 112 may send the one or more API calls to the third-party application 104 causing the third-party application 104 to store the account identifier 126 at the remote database(s) 120 of the third-party application 104 associated with the particular OU 204. As such, the third-party application 104 may perform one or more steps for integrating the account into the third-party application 104, for instance, with the event-driven API call manager 112 and/or in response to the event message 122, which are discussed in greater detail below regarding FIG. 6.

Figure 6:
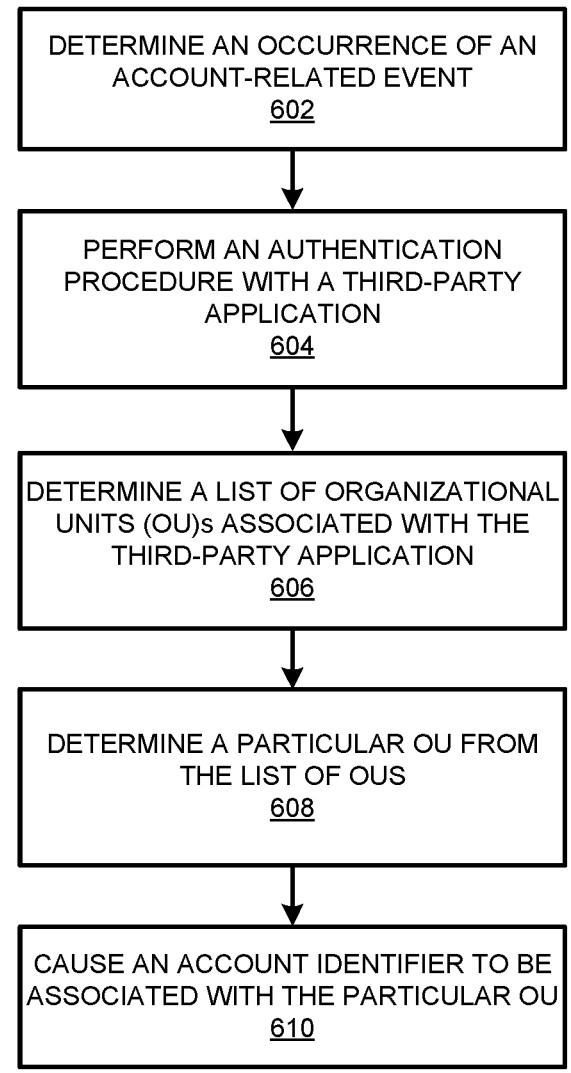
FIG. 6 depicts a flow diagram of an example method for integrating the account with the third-party application, including causing the account identifier to be associated with the particular hierarchical data structure, which may be performed by any systems discussed herein.

FIG. 6 depicts an example method 600 that may be performed by any of the systems discussed herein. In some examples, the method 600 may include one or more steps for integrating the account with the third-party application 104, for instance, with the event-driven API call manager 112. Although steps of the method 600 may be performed by any of the systems disclosed herein, the steps are described below as being performed by the system 100 for brevity sake.

At step 602, the system 100 may determine an occurrence of an account related-event, such as an operation or action performed by the virtual services of the service provider network 102 (e.g., the account creation procedure occurring at the organization account creator and/or the account configuration procedure occurring at the account configurer 108) or other network functions of the service provider network 102. The event monitor 110 may generate the event message representing the account-related event. For instance, the event-driven API call manager 112 may receive the event message 122 from the event monitor 110 indicating the occurrence of the account creation procedure or an account configuration procedure for the account associated with the account identifier 126 in the event message 122.

At step 604, the system 100 may perform an authentication procedure with the third-party application 104. For instance, the event-driven API call manager 112 may send the first API call to the third-party application 104 requesting an authentication token or security key. In response to the first API call, the third-party application 104 may send the authentication token or security key to the event-driven API call manager 112, completing the authentication procedure. The third-party application 104 may send a status 200 response to the event-driven API call manager 112 indicating completion of the authentication procedure.

At system 606, the system 100 may determine the list of OUs 206 associated with the third-party application 104. For instance, the event-driven API call manager 112 may send the second API call to the third-party application 104 requesting that the third-party application 104 send the list of OUs 206 to the event-driven API call manager 112. In response, the third-party application 104 may retrieve the list of OUs 206 from the remote database 120 and/or send the list of OUs 206 to the event-driven API call manager 112.

At step 608 the system 100 may determine the particular OU 204 from the list of OUs 206. For instance, the event-driven API manager 112 may determine the particular OU identifier from the event message 122 by running a comparison loop, based on the OU identifier, on the list of OUs 206 to identify a corresponding OU identifier from the list of OUs 206 that matches the particular OU identifier. Upon identifying the particular OU identifier from the list of OUs 206, the event-driven API manager 112 may send one or more additional API calls to receive the hierarchical data of the particular OU 204 from the third-party application 104.

At step 610, the system 100 may cause the account identifier 126 to be associated with the particular OU 204 at the one or more remote database(s) 120. For instance, the event-driven API call manager 112 may send a third API call to the third-party application 104 instructing the third-party application to add the account identifier 126 to the particular OU 204 such that the account has a position within the hierarchical data reflecting the account creation procedure (e.g., the OU 304). As a result, the event-driven API call manager 112 may integrate the account into the third-party application 104.

Although FIGS. 5 and 6 illustrate example steps, the described steps in these figures (and all other methods, techniques, and operations disclosed herein) may be performed in other orders different than those illustrated in FIGS. 5 and 6, and multiple steps may be performed simultaneously or in parallel. Furthermore, in some embodiments, one or more steps illustrated in FIGS. 5 and 6 may be omitted, repeated, and/or combined with any other steps illustrated in FIGS. 5 and 6 or any other operations and components discussed in this disclosure. Any steps illustrated in FIGS. 5 and 6 may be performed at least partly in response to any of the steps illustrated in FIGS. 5 and 6. For example, method 500 and method 600 may be combined into a single method, and step 602 may occur in response to step 510. In some instances, the steps illustrated in FIGS. 5 and 6 may be performed in multiple iterations for instance, to generate hundreds, thousands, or even millions of event messages 122 corresponding to account-related events to integrate hundreds, thousands, or even millions of accounts with third-party applications 104 across the globe.

Figure 7:
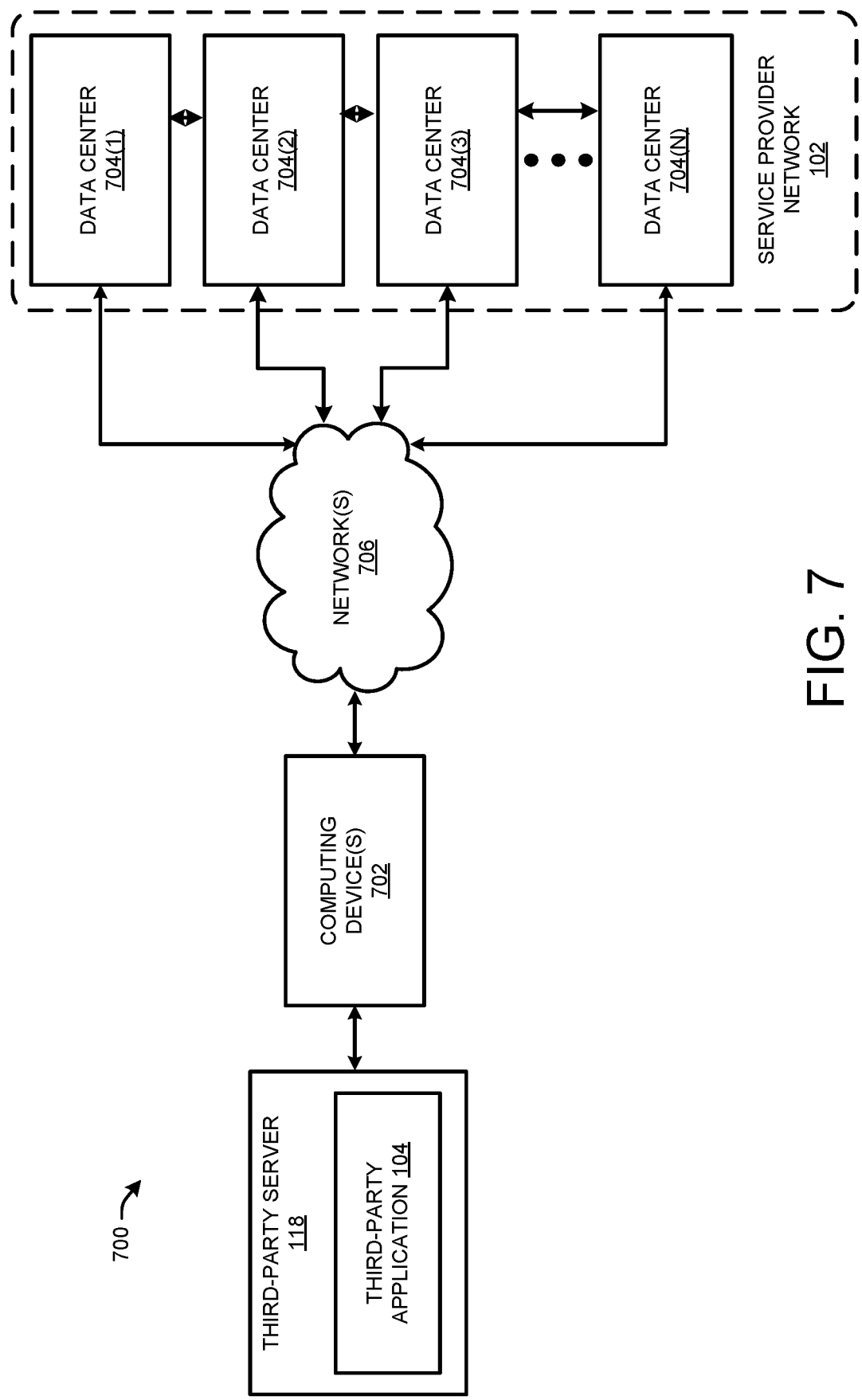
FIG. 7 depicts a schematic diagram showing an example operating environment for the examples disclosed herein that includes a service provider network, which may form at least a part of any systems discussed herein.

FIG. 7 depicts a block diagram that shows an illustrative operating environment 700 for the examples disclosed herein that includes the service provider network 102. FIG. 7 and the following description are intended to provide a brief, general description of a suitable computing environment in which the examples described herein may be implemented. In particular, FIG. 7 is a system and network diagram that shows an illustrative operating environment that includes one or more computing devices 702, the service provider network 102, and the third-party application 104. The one or more computing device(s) 702 may comprise a user device and/or any type of computing device, such as a mobile phone device (e.g., smartphone), a laptop computer, a personal computer ("PC"), a desktop or workstation computer, a personal digital assistant ("PDA"), a wearable-computing device (e.g., glasses, watch, necklace, contact lens, epidermal, etc.), a virtual reality (VR) or augmented reality (AR) headset/device, a holographic device, a stand-alone computer (e.g., raspberry pi, an external drive, etc.), an electronic book (eBook) reader device, a gaming console, a set-top-box, a server computer, a tablet computing device, a home-automation device, a voice-interface device, a consumer electronic device, or combinations thereof. The one or more computing device(s) 702 may include a processor, computer-readable media, a display upon which the processor renders a graphical user interface (GUI), and/or combinations thereof.

The computing resources provided by the service provider network 102 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 102 are enabled in one implementation by one or more data centers 704(1)-704(N) (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein will be described below with regard to FIG. 8.

The users and customers of service provider network 102 may access the computing resources provided by the data centers 704 over a suitable data communications network, such as a Wide Area Network ("WAN"), as illustrated by network(s) 706. Although a WAN might be used, it should be appreciated that a local-area network ("LAN"), the Internet, or any other networking topology known in the art that connects the data centers 704 to the computing devices 702 and/or the third-party server 118 may be utilized. It should also be appreciated that combinations of such networks might also be utilized.

Figure 8:
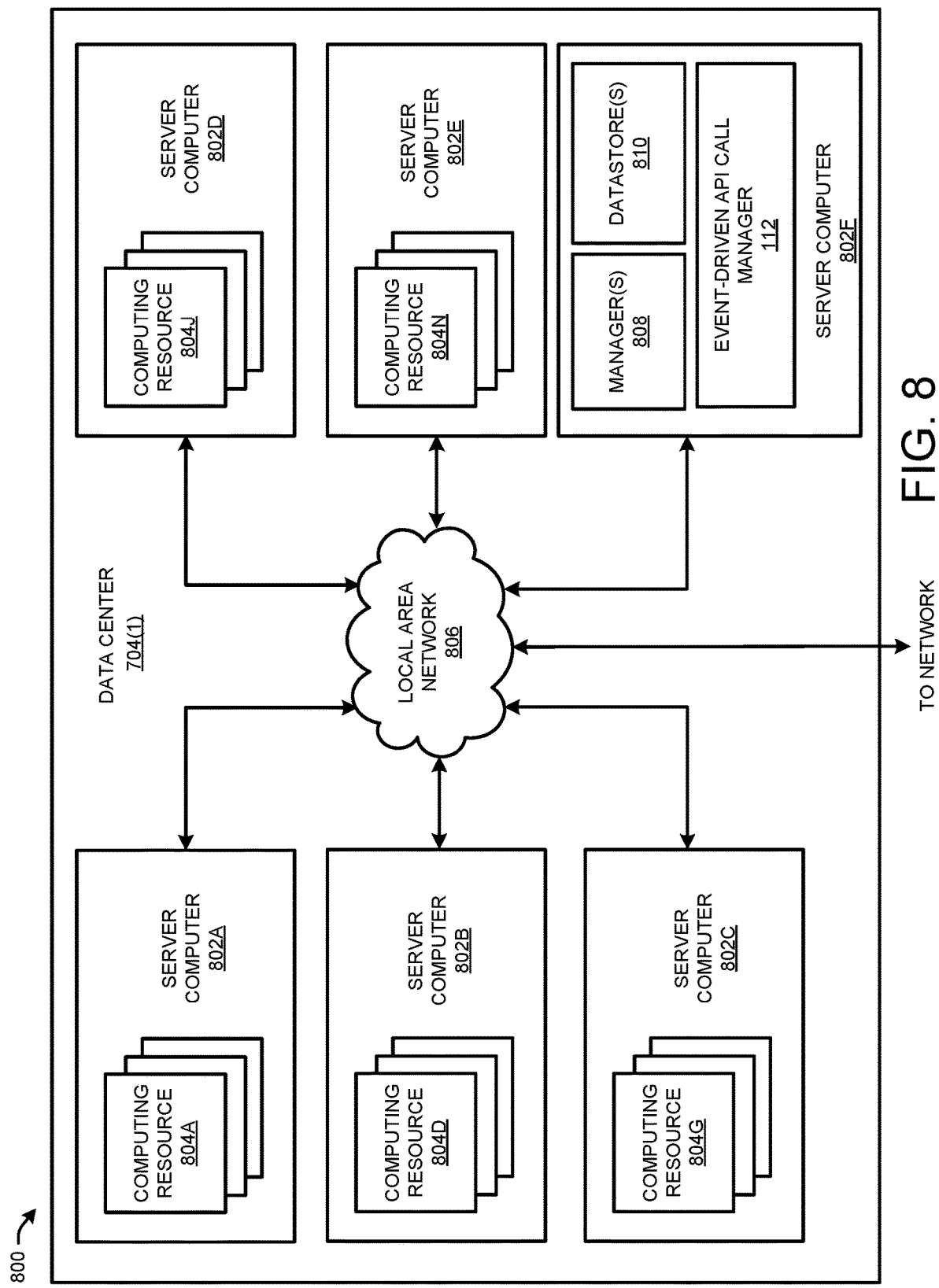
FIG. 8 depicts a schematic diagram showing an example data center that implements aspects of the service provider network, which may form at least a part of any systems discussed herein.

FIG. 8 is a block diagram that illustrates an illustrative architecture 800 of one configuration for a data center 704 that implements aspects of the service provider network 102, including some or all of the concepts and technologies disclosed herein. The example data center 704(1) shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an example, the server computers 802 are configured to execute the software products as described above.

In an example, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager capable of instantiating and managing computing resources and instances of computing resources. In the case of virtual machine instances, for example, the instance manager might be a hypervisor, or another type of program configured to enable the execution of multiple virtual machine instances on a single server computer 802.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 704(1) shown in FIG. 8 also includes a server computer 802F reserved for executing software components for managing the operation of the data center 704(1), the server computers 802, virtual machine instances, and other resources within the service provider network 102. The server computer 802F might also execute one or more managers 808 and include one or more datastores 810, and the event-driven API call manager 112. In this regard, it should be appreciated that while these components are illustrated as executing within service provider network 102, computing systems that are external to service provider network 102 might also be utilized to execute some or all of these components.

In the example data center 704(1) shown in FIG. 8, an appropriate local area network ("LAN") 806 is utilized to interconnect the server computers 802A-802E and the server computer 802F. The LAN 806 is also connected to the network(s) 706 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704(1)-704(N), between each of the server computers 802A-802F in each data center 704 and between virtual machine instances and other types of computing resources provided by the service provider network 102.

It should be appreciated that the data center 704(1) described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A method comprising:
generating, in response to a user input, an account on a service provider network;
generating, at an organization account creator of a first network node of the service provider network or an account configurer of the first network node, a first JavaScript Object Notation (JSON) string including an account identifier associated with the account;
receiving, from the first network node and at an event monitor of a second network node of the service provider network, the first JSON string;
generating, at the event monitor, an event message by aggregating the first JSON string with a second JSON string comprising metadata associated with the account;
sending, from the second network node and to an event-driven API call manager at a third network node of the service provider network, the event message;
extracting, at the event-driven API call manager, the metadata from the event message; and
sending, from the event-driven API call manager and to a third-party application, a plurality of API calls comprising:
a first API call requesting authentication for the event-driven API call manager from the third-party application; and
a second API call instructing the third-party application to add the account to a particular hierarchical data structure of the third-party application.

2. The method of claim 1, wherein the first JSON string is received from the account configurer and includes data generated during an account configuration procedure that modifies an account setting for the account.

3. The method of claim 1, wherein the first JSON string is received from the organization account creator based on an account creation procedure for generating new accounts at the service provider network.

4. The method of claim 1, wherein the particular hierarchical data structure comprises an Organizational Unit (OU) indicating a relation between multiple accounts associated with the service provider network that are monitored by the third-party application.

5. The method of claim 4, wherein the account comprises a first account, the user input comprises a first user input, and further comprising:
generating, in response to a second user input, a second account, wherein the first account is below the second account in the hierarchical structure, and the first JSON is generated in response to the first account being created from the second account.

6. A system comprising:
one or more processors; and
computer-readable media storing instructions that, when executed by the one or more processors, cause the system to:
receive, at least partly in response to an event, an event message comprising a first string including an account identifier associated with an account and a second string including metadata associated with the account;
extract the metadata from the event message; and
send, to a third-party application, a plurality of API calls based at least partly on the metadata, the plurality of API calls comprising:
a first API call requesting, from the third-party application, authentication for an event-driven API call manager; and
at least a second API call instructing the third-party application to integrate the account with the third-party application.

7. The system of claim 6, wherein extracting the metadata comprises extracting a hierarchical data structure identifier, and the instructions, when executed by the one or more processors, further cause the system to identify a particular hierarchical data structure from a list of hierarchical data structures based at least partly on the hierarchical data structure identifier.

8. The system of claim 6, wherein the metadata comprises one or more of an account name associated with the account, an email address associated with the account, an account identifier associated with the account, a hierarchical data structure associated with the account, or a geographic location associated with the account.

9. The system of claim 6, wherein the metadata comprises formatting instructions for the event message causing the event message to trigger the event-driven API call manager.

10. The system of claim 6, wherein the event comprises one or more of an identity and access management (IAM) event, creation of a user, creation of a user role, creation of a group, a domain name system (DNS) entry, or creation of a server instance.

11. The system of claim 6, wherein the instructions, when executed by the one or more processors, further cause the system to determine a project identifier associated with a project of a particular hierarchical data structure, wherein the second API call further instructs the third-party party application to associate the account identifier with the project identifier.

12. The system of claim 6, wherein the first API call comprises a request for a list of hierarchical data structures associated with the third-party application.

13. The system of claim 12, wherein, in response to the first API call, the instructions, when executed by the one or more processors, further cause the system to receive, from the third-party application, the list of hierarchical data structures including a first hierarchical data structure corresponding to a first service provider network and a second hierarchical data structure corresponding to a second service provider network that is a separate network from the first service provider network.

14. The system of claim 13, wherein the third-party application comprises a multi-cloud account management application.

15. A method comprising:
receiving, at a server device or a service provider network, an event message indicating an occurrence of an event associated with an account; and
in response to receiving the event message, send a plurality of API calls to a third-party application, the plurality of API calls comprising:
a first API call requesting, from the third-party application, authentication for an event-driven API call manager; and
at least a second API call instructing the third-party application to integrate the account with the third-party application.

16. The method of claim 15, further comprising, prior to receiving the event message, storing code for sending the plurality of API calls at the server device in a non-executing state.

17. The method of claim 15, wherein the event comprises one or more of an identity and access management (IAM) event, creation of the account, completion of an account configuration procedure, creation of a user, creation of a user role, creation of a group, or creation of a server instance.

18. The method of claim 15, wherein the server device comprises a first server device and wherein the third-party application is stored or executed at a second server device outside the service provider network and in communication with the first server device.

19. The method of claim 15, wherein the at least second API call comprises:
a second API call comprising a request for a list of hierarchical structures; and
upon receiving the list of hierarchical data structures from the third-party application, a third API call associated with the third-party application, the third API call instructing the third-party application to add the account to a particular hierarchical data structure from the list of hierarchical data structures.

20. The method of claim 15, wherein:
the plurality of API calls further comprise a third API call querying the third-party application for one or more projects or groups associated with the particular hierarchical data structure;
the method further comprises receiving the one or more projects or groups from the third-party application, the at least second API call being based at least in part on the one or more projects or groups.

* * * * *